United States Patent
Kishi et al.

(10) Patent No.: US 6,868,478 B2
(45) Date of Patent: Mar. 15, 2005

(54) METHOD, SYSTEM, AND ARTICLE OF MANUFACTURE FOR OPTIMIZING STORAGE UTILIZATION

(75) Inventors: Gregory Tad Kishi, Oro Valley, AZ (US); Aare Onton, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 10/176,354

(22) Filed: Jun. 20, 2002

(65) Prior Publication Data

US 2003/0236942 A1 Dec. 25, 2003

(51) Int. Cl.[7] .............................................. G06F 12/00
(52) U.S. Cl. ........................................ 711/113; 711/112
(58) Field of Search ................... 711/112–13, 152–154; 707/201–204, 1; 364/92; 714/6

(56) References Cited

U.S. PATENT DOCUMENTS

| | | | | |
|---|---|---|---|---|
| 4,945,428 A | * | 7/1990 | Waldo ........................... 360/92 |
| 5,072,378 A | * | 12/1991 | Manka ........................... 714/6 |
| 5,313,631 A | * | 5/1994 | Kao ............................. 707/204 |
| 5,809,511 A | * | 9/1998 | Peake ........................... 707/204 |
| 5,870,732 A | * | 2/1999 | Fisher et al. .................... 707/1 |
| 5,926,834 A | | 7/1999 | Carlson et al. ................. 711/152 |
| 5,983,316 A | * | 11/1999 | Norwood ...................... 711/112 |
| 6,014,675 A | | 1/2000 | Brewer et al. ................ 707/204 |
| 6,067,599 A | | 5/2000 | Kishi et al. ................... 711/113 |
| 6,105,037 A | | 8/2000 | Kishi ........................... 707/201 |
| 6,199,146 B1 | | 3/2001 | Pence .......................... 711/154 |
| 6,269,423 B1 | | 7/2001 | Kishi ........................... 711/113 |
| 6,282,609 B1 | | 8/2001 | Carlson ........................ 711/112 |

OTHER PUBLICATIONS

U.S. Appl. No. 09/391,188, filed Sep. 7, 1999, entitled "Cache Storage Optimization in a Data Storage Library of a Redundant Copy Synchronization Token Tracking System", inventors T.W. Bish, et al.

M. Werner, et al., "Magstar Peer–to–Peer Virtual Tape Server Planning and Implementation Guide", IBM, Document No. SG24–6115–00, Dec. 2000, Chapter 2, pp. 7–48.

* cited by examiner

*Primary Examiner*—Nasser Moazzami
(74) *Attorney, Agent, or Firm*—Rabindranath Dutta; Konrad Raynes, & Victor LLP

(57) ABSTRACT

Provided are a method, system, and an article of manufacture for optimizing storage utilization. Logical volumes are stored in a cache, wherein the cache is coupled to a plurality of physical devices. An optimum number of physical devices selected from the plurality of physical devices is determined. The logical volumes are transferred from the cache to the optimum number of physical devices.

33 Claims, 6 Drawing Sheets

US 6,868,478 B2

METHOD, SYSTEM, AND ARTICLE OF MANUFACTURE FOR OPTIMIZING STORAGE UTILIZATION

BACKGROUND OF THE INVENTION

1. Field of the Invention

The present invention relates to a method, system, and an article of manufacture for optimizing the utilization of storage.

2. Description of the Related Art

In prior art virtual tape storage systems, hard disk drive storage emulates tape drives and tape cartridges. For instance, host systems perform input/output (I/O) operations with respect to a tape library by performing I/O operations with respect to a set of hard disk drives that emulate the tape library. In prior art virtual tape storage systems, such as the International Business Machines (IBM) Magstar** Virtual Tape Server, at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a cache to volumes in the tape library. In VTS operations, the VTS intercepts the host's requests to access a volume in the tape library and returns data for such requests from the cache. If the volume is not in the cache, then the VTS recalls the volume from the tape library to the cache, i.e., the VTS transfers data from the tape library to the cache. The VTS can respond to host requests for volumes that are present in the cache substantially faster than requests for volumes that have to be recalled from the tape library to the cache.

The cache can satisfy requests faster than the tape library. Hence, I/O requests can be satisfied faster if frequently accessed volumes are kept in the cache. However, since the capacity of the cache is relatively small when compared to the tape library, not all volumes can be kept in the cache. Hence, the VTS also premigrates volumes from the cache to the tape library, i.e., the VTS transfers data from the cache to the tape cartridges in the tape library.

Notwithstanding the use of the VTS to premigrate volumes from the cache to the tape library, there is a need in the art for improved techniques for premigrating volumes from the cache to the tape library.

SUMMARY OF THE PREFERRED EMBODIMENTS

Provided are a method, system, and an article of manufacture for optimizing storage utilization. Logical volumes are stored in a cache, wherein the cache is coupled to a plurality of physical devices. An optimum number of physical devices selected from the plurality of physical devices is determined. Data in the logical volumes are transferred from the cache to the optimum number of physical devices.

In additional implementations of the invention, the plurality of physical devices are addressed by a host via a plurality of logical devices, and wherein the determining of the optimum number of physical devices further comprises comparing a number of logical devices in use with a predetermined number of logical devices, and based on the comparison determining the optimum number of physical devices.

In additional implementations of the invention, the determining of the optimum number of physical devices further comprises comparing a data transfer rate at the cache with a predetermined maximum data transfer rate at the cache, and based on the comparison determining the optimum number of physical devices.

In further implementations of the invention, the cache and the physical devices are controlled by a virtual tape server in communication with a plurality of hosts, and wherein the determining of the optimum number of physical devices further comprises comparing a data transfer rate between the hosts and the virtual tape server with a predetermined maximum data transfer rate, and based on the comparison determining the optimum number of physical devices.

In additional implementations of the invention, the determining of the optimum number of physical devices further comprises comparing a CPU utilization rate with a predetermined CPU utilization rate, and based on the comparison determining the optimum number.

In further implementations of the invention, the determining of the optimum number of physical devices further comprises comparing the average size of the logical volumes that are queued for premigration to the physical devices, and based on the comparison, determining the optimum number of physical devices.

The implementations optimize the utilization of physical devices in a virtual tape server by adjusting the number of physical devices to be used for premigration of data in logical volumes from the cache to the physical devices. The implementations increase the overall performance of the virtual tape server by allocating an optimum number of physical devices for premigration.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
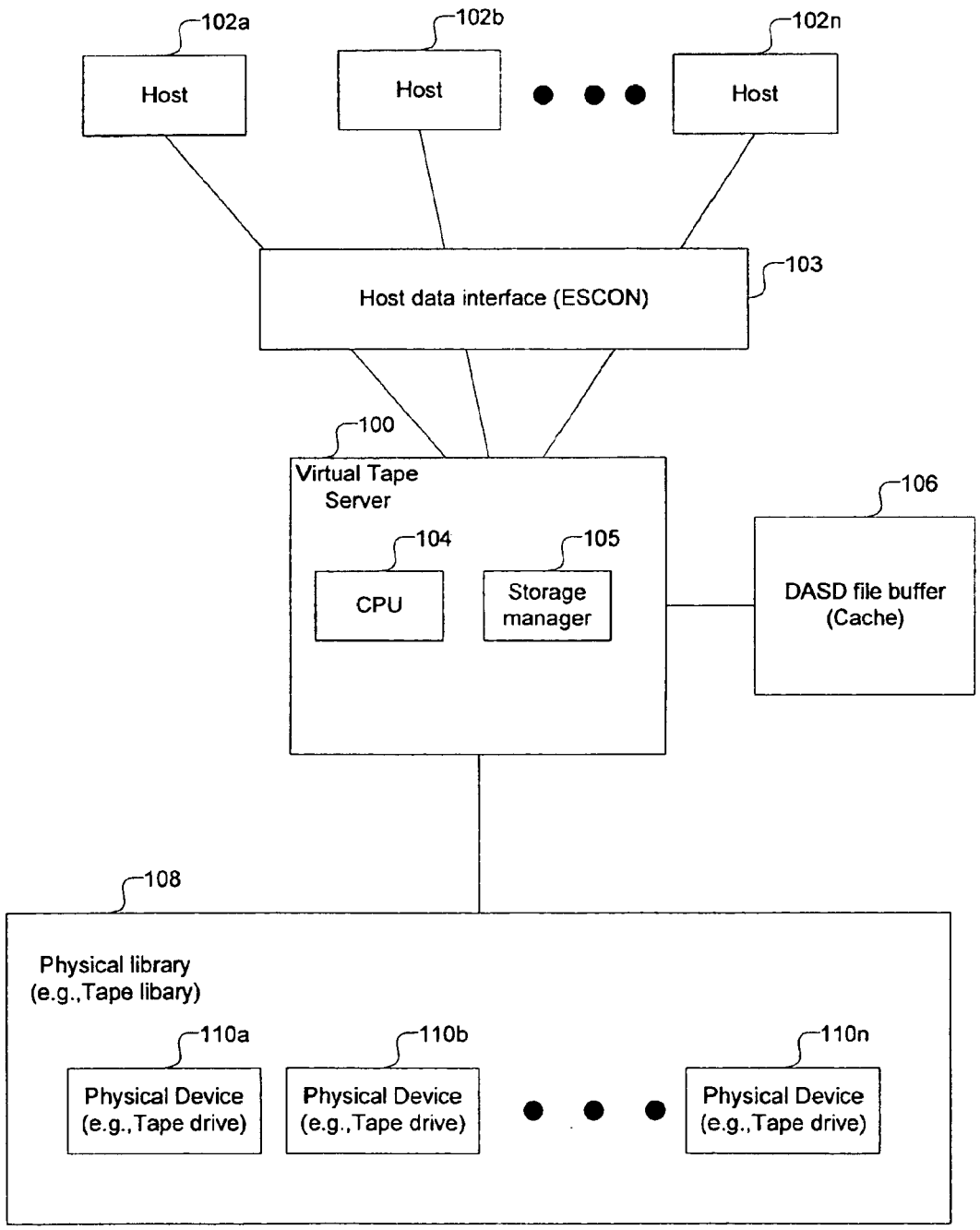
FIG. 1 illustrates a block diagram of a computing environment in which certain described aspects of the invention are implemented.

FIG. 1 illustrates a computing environment utilizing a Virtual Tape Server (VTS) 100. Additional VTSs can be deployed, but for purposes of illustration, a single VTS 100 is shown. The VTS 100 is any server computational device known in the art and includes any operating system known in the art. For instance, in certain implementations of the invention, the VTS 100 may be implemented in one or more computers comprising an IBM RS/6000 system and include the IBM AIX operating system.

A plurality of hosts 102a, 102b, ..., 102n connect to the VTS 100. The hosts 102a ... 102n may connect to the VTS 100 through a host data interface 103 channel, such as the Enterprise System Connection (ESCON) channel or any other switching mechanism known in the art (e.g., fibre channel, Storage Area Network (SAN) interconnections, etc.). The hosts 102a ... 102n may be any computational device known in the art, such as a personal computer, a workstation, a server, a mainframe, a hand held computer, a palm top computer, a telephony device, network appliance, etc. The hosts 102a ... 102n may include any operating system known in the art, such as the IBM OS/390 operating system.

**IBM, Tivoli, RS/6000, AIX, and Magstar, OS/390 are trademarks of International Business Machines Corp.

The VTS 100 includes at least one central processing unit (CPU) 104 and an application, such as a storage manager 105 that optimizes storage utilization. The storage manager 105 may be implemented either as a standalone application or as a part of one or more other applications. The storage manager 105 controls access to a cache 106, such as a DASD file buffer, and a physical library 108, such as a tape library. In certain implementations, the storage manager 105 may include software to utilize a tape library, such as the IBM Magstar Virtual Tape Server, and the IBM ADSTAR Distributed Management (ADSM) software or Tivoli Storage Manager. The storage manager 105 may perform the data movement operations between the hosts 102a ... 102n, the cache 106, and the physical library 108. Further details of the VTS technology are described in the IBM publication "Magstar** Peer-to-Peer Virtual Tape Server Planning and Implementation Guide," IBM document no. SG24-6115-00 (Copyright IBM, 2000), which publication is incorporated herein by reference in its entirety.

The physical library 108 may comprise an IBM Magstar Tape Library, such as the Magstar 3494 Tape Library, or any other tape library system known in the art. In certain implementations, the physical library 108 comprises numerous physical devices 110a, 110b, ... 110n, such as tape drives, CD ROM drives, DVD ROM drives, etc.

The cache 106 may comprise numerous interconnected hard disk drives. The cache 106 improves performance by allowing host I/O requests from the hosts 102a ... 102n to the physical library 108 to be serviced from the faster accessible cache 106 as opposed to the slower accessible physical library 108. The disks in the cache may be arranged as a Direct Access Storage Device (DASD), Just a Bunch of Disks (JBOD), Redundant Array of Inexpensive Disks (RAID), etc.

Figure 2:
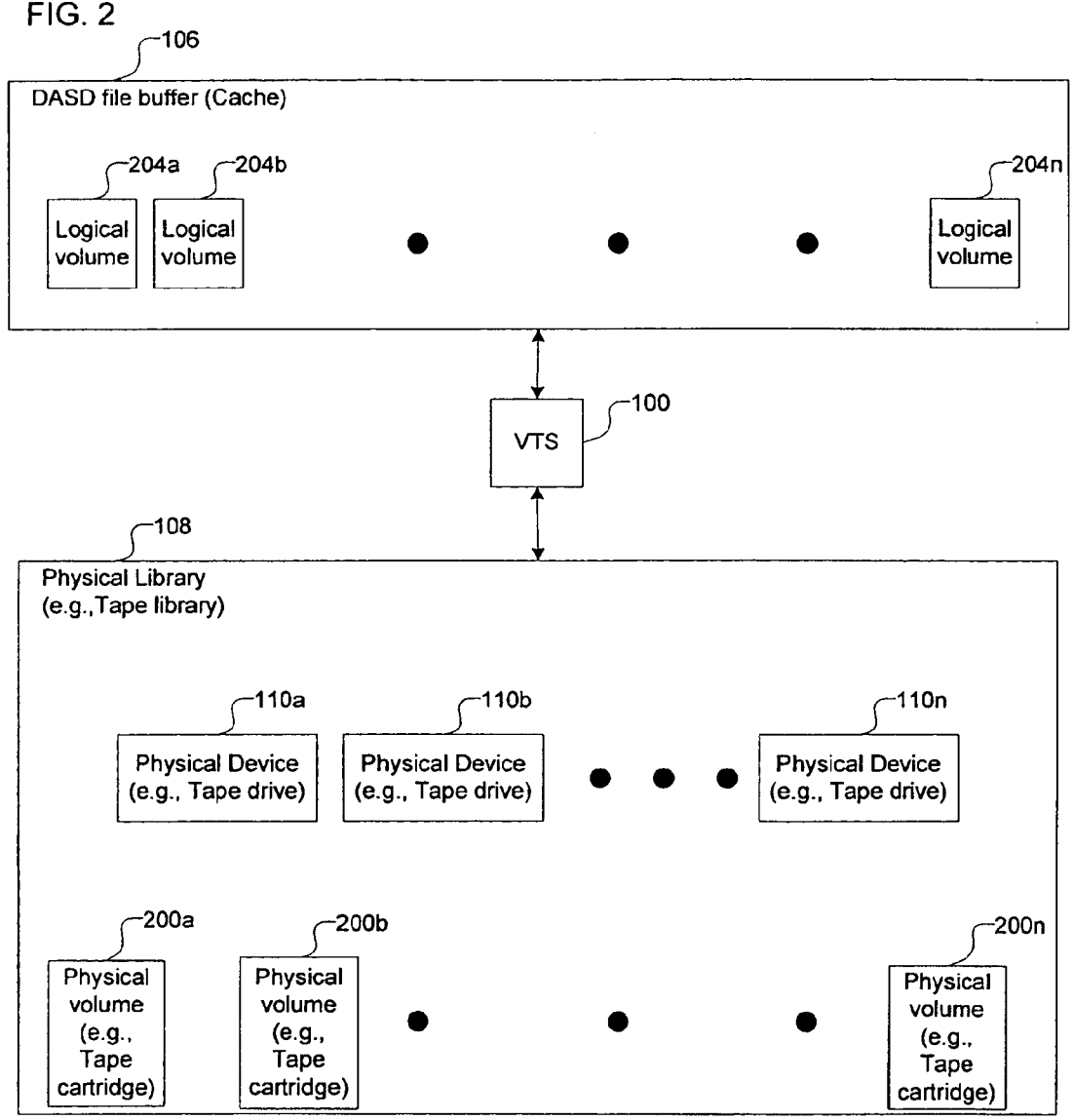
FIG. 2 illustrates a block diagram including a cache and a physical library, in accordance with certain described implementations of the invention.

FIG. 2 illustrates a block diagram including the VTS 100, the cache 106 and the physical library 108, in accordance with certain implementations of the invention. The physical library 108, in addition to including the physical devices 110a ... 110n, includes physical volumes 200a ... 200n. A physical volume may be mounted on any of the physical devices 110a ... 110n. In certain implementations the physical volumes are tape cartridges that may be mounted via mechanical loading onto the physical devices 110a ... 110n. In alternative implementations the physical volumes may be CD ROMs, DVDs or other storage media. The number of physical volumes 200a ... 200n are larger than the number of physical devices 110a ... 110n.

The storage manager 105 maps the cache 106 to a plurality of logical (virtual) devices. The hosts 102a ... 102n perform I/O operations by accessing logical (virtual) volumes in the logical devices via the VTS 100. The storage manager 105 maps the logical volumes to the physical volumes 200a ... 200n. Although the hosts 102a ... 102n access data via logical volumes and logical devices, the data is physically stored in the physical volumes 200a ... 200n mountable on the physical devices 110a ... 110n.

The logical volumes 204a ... 204n corresponding to the physical volumes 200a ... 200n may be resident in the cache 106. In FIG. 2, the cache 106 contains logical volumes 204a, 204b, ... 204n. The logical volumes resident on the cache 106 may change over time. The storage manager 105 attempts to keep the more likely to be used logical volumes in the cache 106.

When a host 102a ... 102n writes a logical volume to the VTS 100, the data is stored as a file in the cache 106. The cached data is later migrated onto a physical volume 200a ... 200n. The original logical volume is left in the cache 106 for cache hits. When the cache 106 fills to a predetermined threshold, the logical volume data for a selected logical volume 204a ... 204n is removed from the cache to free space for more logical volumes. In certain implementations, the storage manager 105 removes from the cache 106 a selected logical volume 204a ... 204n that has been resident on the cache 106 for the longest period of time. The process of transferring data from the cache 106 to the physical library 108 is referred to as premigration.

When a host 102a ... 102n requests a logical volume from the VTS 100, a cache hit occurs if the logical volume is resident in the cache. If the logical volume is not resident in the cache, the storage manager 105 determines whether the corresponding physical volume 200a ... 200n is mounted on one of the physical devices 110a ... 110n. If the corresponding physical volume 200a ... 200n is not mounted then the storage manager 105 mounts the corresponding physical volume 200a ... 200n on one of the physical devices 110a ... 110n. The data for the logical volume is then transferred back, i.e., recalled, from the corresponding physical volume 200a ... 200n. Recall operations can take several minutes. The recall latency includes the time for a robotic arm to access a tape cartridge and insert the tape cartridge into a tape drive, and the time to locate the tape to a desired location.

The major operations occurring between the cache 106 and the physical devices 110a ... 110n are premigration (i.e., the transfer of data from the cache 106 to the physical volumes 200a ... 200n) and recall (i.e., the transfer of data from the physical volumes 200a ... 200n to the cache 106). In certain implementations the VTS 100 provides an N:1 ratio, where N is typically 10–20, of logical devices to physical devices 110a ... 110n. In such implementations, since there are more physical volumes 200a ... 200n (corresponding to the logical volumes stored in the logical devices) than physical devices 110a ... 110n, there may be time periods when the VTS 100 has more physical volumes to be mounted for recalls than there are physical devices in the VTS 100. As a result, there may be long queuing delays on recalls. These delays may be exacerbated if the storage manager 105 has to unmount physical volumes from the physical devices to satisfy the recalls.

In the VTS 100, the rate of premigration of logical volumes per period of time increases as the number of physical devices 110a . . . 110n increases. However, using all the physical devices 110a . . . 110n for premigration is undesirable because if a recall has to be satisfied when all the physical devices 110a . . . 110n are in use then there may be a significant delay as the storage manager 105 has to unmount at least one physical volume from a physical device to satisfy the recall. Furthermore, in certain situations, such as when the number of physical devices 110a . . . 110n are numerous, for various reasons such as the potential for excessive load on the CPU 104, the storage manager 105 may have to limit the number of physical devices 110a . . . 110n to which the storage manager 105 may premigrate data. For instance, in certain implementations each physical device 110a . . . 110n has a buffer and the performance of the physical device 110a . . . 110n is optimal when there is no overflow or underflow of data in the buffer. Underflow of data in the buffer can occur when the CPU 104 is unable to supply the buffer at a high enough rate, such as when the number of physical devices 110a . . . 110n exceed the data transfer capabilities of the CPU 104 during premigration.

Figure 3:
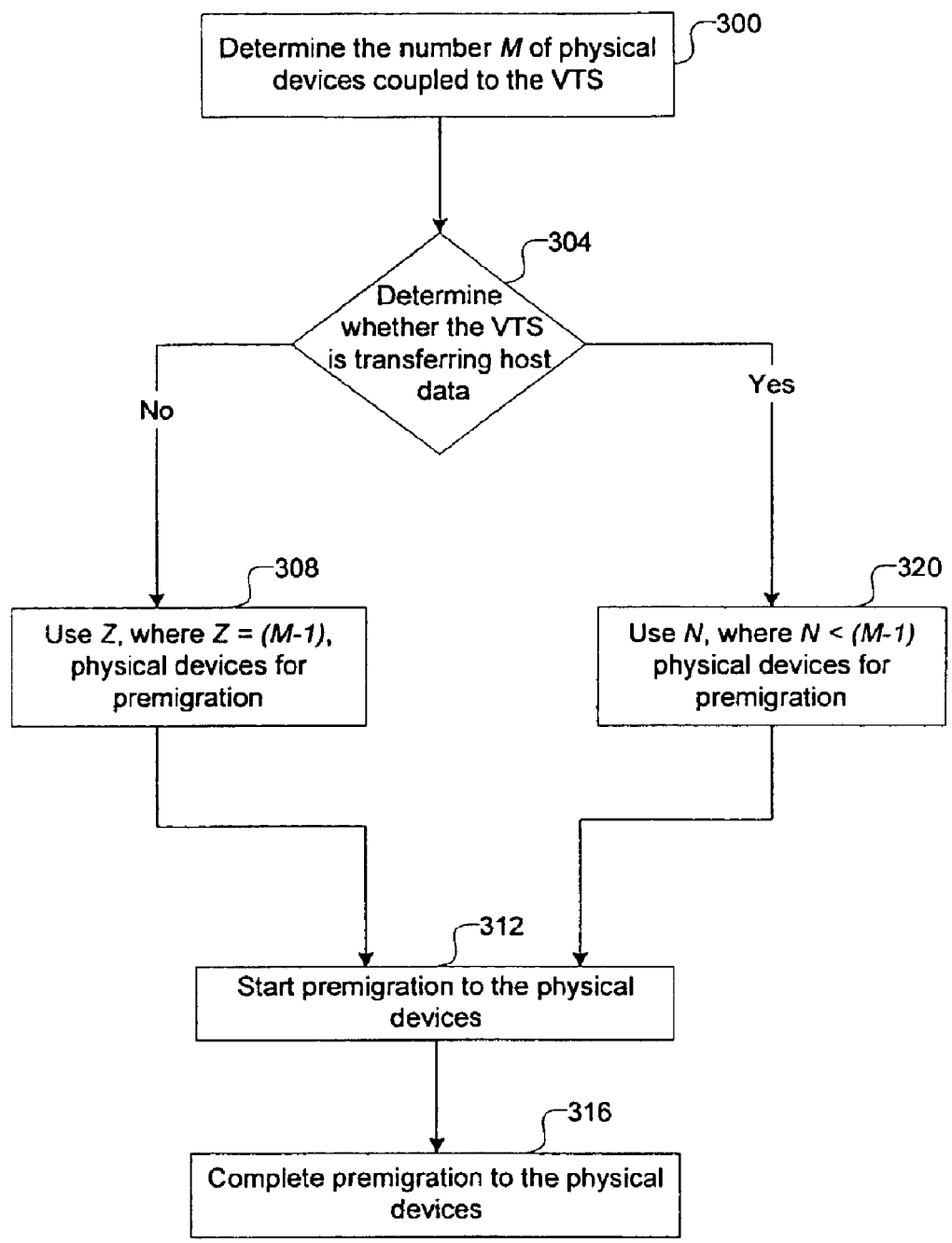
FIG. 3 illustrates logic implemented in a virtual tape server to determine the number of physical devices to use for premigration, in accordance with certain described implementations of the invention.

FIG. 3 illustrates logic implemented in the storage manager 105 to determine the number of physical devices 110a . . . 100n to use for premigration, in accordance with certain described implementations of the invention.

The storage manager 105, determines (at block 300) the number M of physical devices 110a . . . 110n coupled to the VTS 100. The storage manager 105 then determines (at block 304) whether the VTS 100 is transferring host data from the cache 106 to the physical library 108. The mechanisms to determine whether the VTS 100 is transferring host data from the cache 106 to the physical library 108 will be described in FIG. 4.

If at block 304, the storage manager 105 determines that the VTS is not transferring host data, then control proceeds to block 308, where the storage manager 105 designates the use of Z physical devices for premigration of data, where Z=M−1. In such a case, all except one physical device is being used for premigration of data. Control proceeds to block 312, where the storage manager 105 starts the premigration of data to the Z physical devices selected from the physical devices 110a . . . 110n. The applications 105 completes (at block 316) the premigration of data to the Z physical devices selected from the physical devices 110a . . . 110n.

If at block 304, the storage manager 105 determines that the VTS is transferring host data, control proceeds to block 320 where the storage manager 105 designates the use of N physical devices for premigration of data, where N<(M−1). Unlike in block 308, where the storage manager 105 designates the use of all physical devices 110a . . . 110n but one for premigration, in block 320 a lesser number of physical devices are used for premigration. When the VTS 100 is transferring host data, the VTS 100 can efficiently use only N physical devices for premigration. The VTS 100 can only efficiently use N physical devices because there is not enough CPU power to efficiently use Z physical devices while the CPU 104 is being used to transfer host data. Furthermore, interactions such as queuing and I/O delays between the host data packets and the data packets being transferred to the physical devices 110a . . . 110n also limit the number of physical devices that can be used efficiently.

Hence, the logic of FIG. 3 ensures that when the system is transferring host data, there is an advantage to having P, where P=M−N, physical devices free for reduced recall time. In such a case P physical devices are empty and are ready to accept physical volumes with no dismount penalties. Furthermore, with fewer than the maximum number of physical devices assigned to premigration, those physical devices can stream data more efficiently because more CPU time is available to move data to the device buffers. In addition, the mount times for physical devices is reduced, making the VTS 100 more responsive because there are fewer dismount penalties.

FIGS. 4a, 4b, 4c, 4d, 4e illustrate logic implemented in the storage manager 105 to determine the number of physical devices to use for premigration in certain situations, in accordance with certain implementations of the invention. As described in block 304 of FIG. 3, in order to determine whether the storage manager 105 should use N physical devices or Z physical devices for premigration, the storage manager 105 determines whether or not the VTS 100 is transferring host data. The determination of whether the VTS 100 is transferring host data can be performed via a variety of techniques and some of the techniques are described in FIGS. 4a, 4b, 4c, 4d, 4e.

Figure 4A:
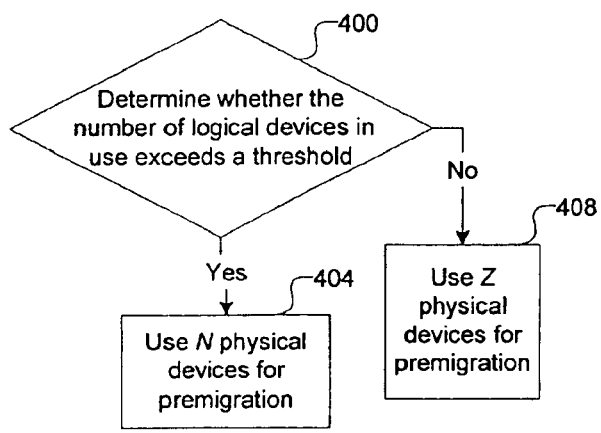
FIGS. 4a, 4b, 4c, 4d, 4e illustrate logic implemented in a virtual tape server to determine the number of physical devices to use for premigration in certain situations, in accordance with certain described implementations of the invention.

In FIG. 4a, the storage manager 105 determines (at block 400) whether the number of logical devices in use by the hosts 102a . . . 102n exceeds a predetermined threshold. A large number of logical devices may increase the load on the CPU 104. Hence, when the number of logical devices used by the host 102a . . . 102n increases, the number of physical devices to be allocated to the CPU 104 for premigration should be decreased to provide more bandwidth for optimal steady transfer of data to physical devices 110a . . . 110n from logical volumes 204a . . . 204n in the cache.

Hence, if the number of logical devices in use by the hosts 102a . . . 102n exceeds a predetermined threshold, control proceeds to block 404 and the storage manager 105 allocates N physical devices for premigration. If the number of logical devices in use by the hosts 102a . . . 102n does not exceed a predetermined threshold, control proceeds to block 408 and the storage manager 105 allocates more physical devices, Z, for premigration.

Figure 4B:
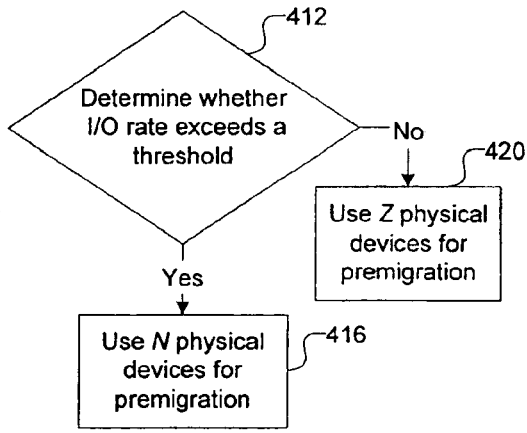

In FIG. 4b, the storage manager 105 determines (at block 412) whether the I/O rate exceeds a predetermined threshold, where the I/O rate is measured at the cache 106, i.e., at the DASD. If so, control proceeds to block 416 and the storage manager 105 uses fewer physical devices, N, for premigration to provide more bandwidth to transfer data between cache 106 and physical volumes 200a . . . 200n. If not, control proceeds to block 420 and the storage manager 105 uses more physical devices, Z, for premigration.

If the I/O rate as measured at the cache is high the load on the CPU 104 is high. Hence, in the logic of FIG. 4b the number of physical devices used for premigration is decreased to N when the I/O rate exceeds a predetermined threshold.

Figure 4C:
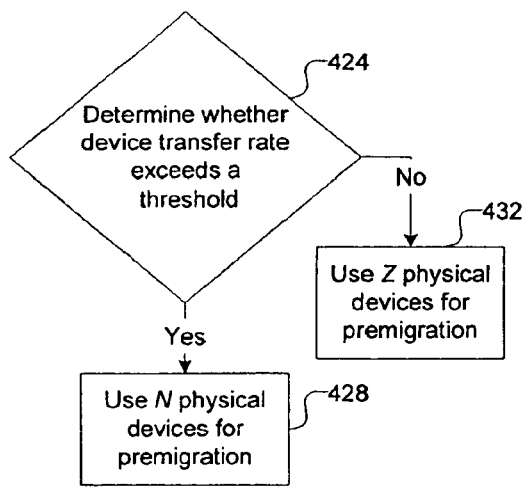

In FIG. 4c, the storage manager 105 determines (at block 424) whether the device transfer rate exceeds a predetermined threshold, where the device transfer rate is the data transfer rate measured at the host data interface 103, i.e. at the channel. If so, control proceeds to block 428 and the storage manager 105 allocates fewer physical devices, N, for premigration. If not, control proceeds to block 432 and the storage manager 105 allocates more physical devices, Z, for premigration.

If the device transfer rate as measured at the host data interface 103 is high the load on the CPU 104 is high. Hence, in the logic of FIG. 4c the number of physical devices used for premigration is decreased to N when the device transfer rate exceeds a predetermined threshold. In contrast to the logic of FIG. 4b where the rate of data transfer was measured at the cache 106, in the logic of FIG. 4c the rate of data transfer is measured at the host data interface 103.

Figure 4D:
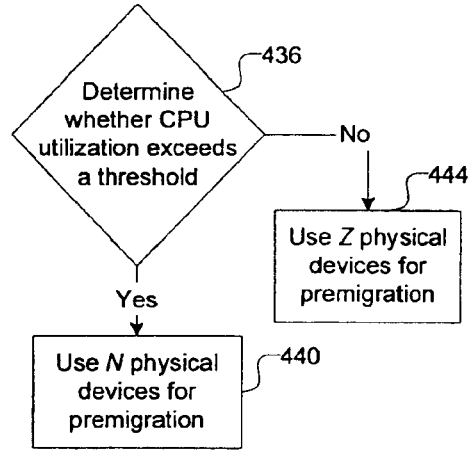

In FIG. 4d, the storage manager 105 determines (at block 436) whether the utilization of the CPU 104 exceeds a predetermined threshold. If so, control proceeds to block 440 and the storage manager 105 allocates fewer physical devices, N, for premigration as the load on the CPU 105 should be reduced. If not, control proceeds to block 444 and the storage manager 105 allocates more physical devices, Z, for premigration (in order to increase the utilization of the CPU 104 towards the predetermined threshold).

Figure 4E:
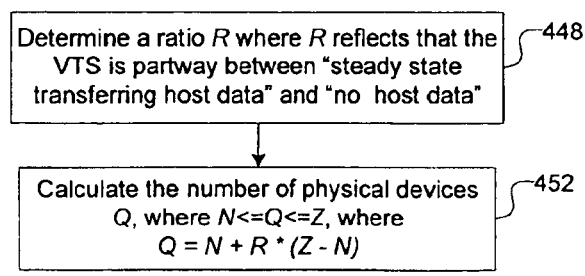

In FIG. 4e, the storage manager 105 determines (at block 424) a ratio R (R varies between zero and one) where R reflects that the storage manager 105 is partway between transferring no host data and steady state transferring of host data, i.e., the storage manager 105 is not transferring host data in an optimal manner but at the same time is not in a state where the storage manager 105 is not transferring any host data. The ratio R indicates the extent to which the storage manager 105 is transferring host data. If the storage manager 105 is transferring a lot of host data the ratio R is low (i.e., R is substantially close to zero) whereas if storage manager 105 is transferring a small amount of host data the ratio R is high (i.e., R is substantially close to one).

Control proceeds to block 452, and the storage manager 105 calculates the number of physical devices Q, where $N<=Q<=Z$, and $Q=N+R*(Z-N)$, physical devices for premigration. Thus the number of physical devices Q lies between N and Z. If the ratio R is high (i.e., R is substantially close to one, implying that a small amount of host data is being transferred) then the number of physical devices Q is more and is closer to Z. If the ratio R is low (i.e., R is substantially close to zero, implying that a large amount of host data is being transferred) then the number of physical devices Q is less and is closer to N. Thus, in the logic of FIG. 4e, the number of physical devices 110a . . . 110n used for premigration varies from N to Z and the variation depends on the ratio R, which reflects the extent of host data transfer.

The logic of FIG. 4e can be used to extend the logic described in each of the FIGS. 4a, 4b, 4c, 4d to recognize that the storage manager 105 is partway between steady state transferring host data and transferring no host data.

The logic described for FIGS. 4a, 4b, 4c, 4d, and 4e may be used separately as shown. In alternative implementations, the logic described in more than one of the FIGS. 4a, 4b, 4c, 4d, 4e may be combined to determine the number of physical devices 110a . . . 110n to be used for premigration. In further alternative implementations, different weights could be given to the different factors based on which adjustments are made to the number of physical devices used for premigration.

There may be other factors besides the ones described in FIGS. 4a, 4b, 4c, 4d, 4e that may be used to determine the number of physical devices to be used for premigration in a manner analogous to the logic illustrated in FIGS. 4a, 4b, 4c, 4d, 4e.

Figure 5:
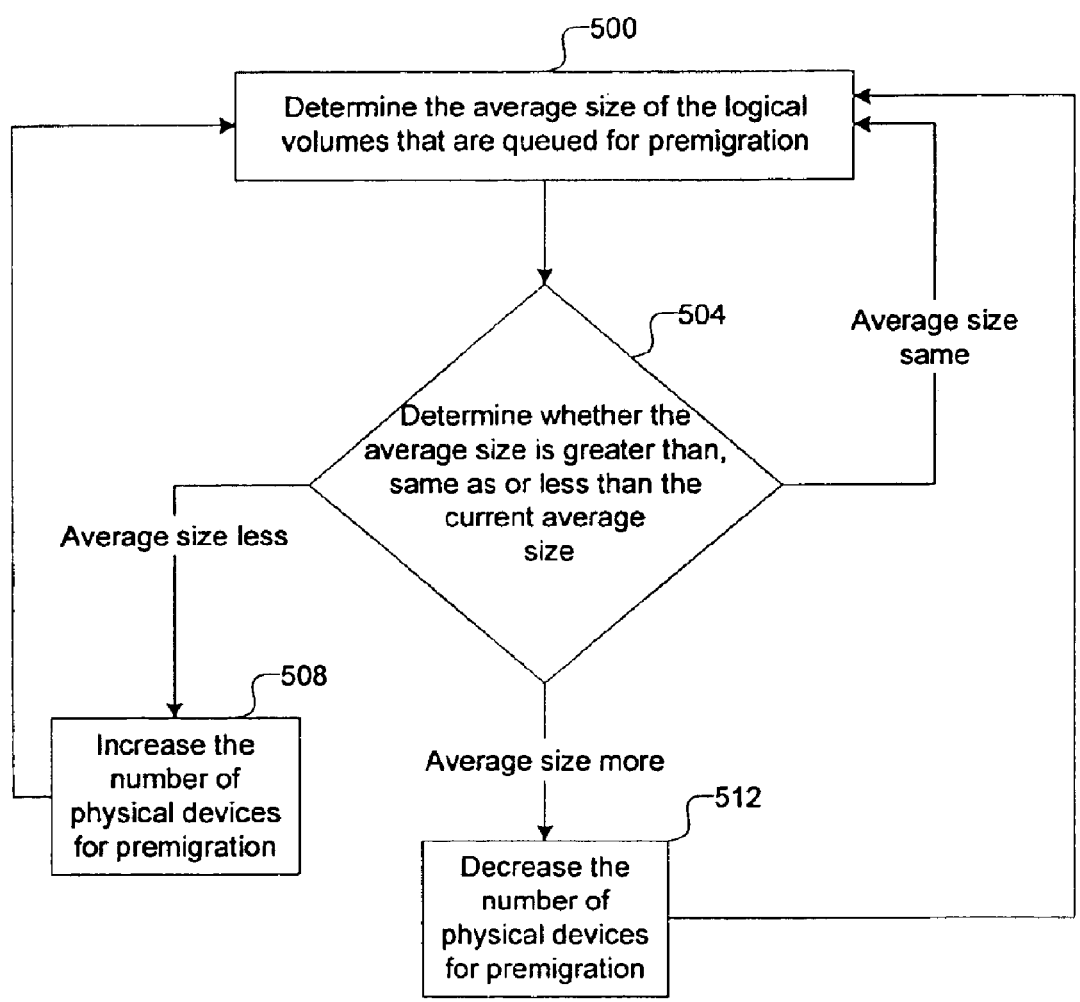
FIG. 5 illustrates logic implemented in a virtual tape server to determine the number of physical devices to use for premigration based on the size of logical volumes, in accordance with certain described implementations of the invention.

FIG. 5 illustrates logic implemented in the storage manager 105 to determine the number of physical devices to use for premigration based on the size of logical volumes, in accordance with certain implementations of the invention.

Once the storage manager 105 determines that the storage manager 105 is in a mode where the storage manager 105 is using N devices for premigration, the storage manager 105 may also recognize that N is affected by the size of the logical volumes being premigrated.

Control begins at block 500, where the storage manager 105 determines the average size of the logical volumes that are queued for premigration. The average size of the logical volumes that are queued for premigration may provide a prediction of the efficiency of the future premigration workload on the VTS 100. In certain implementations, there is a fixed delay in the premigration of a logical volume regardless of the size of the logical volume. Therefore, the impact on performance is greater when premigrating smaller logical volumes.

Control proceeds to block 504, where the storage manager 105 determines whether the average size of the logical volumes that are queued for premigration is greater than, equal to or less than the average size of the logical volumes currently undergoing premigration.

If at block 504, the storage manager 105 determines that the average size of queued logical volumes is greater than the average size of the logical volumes currently undergoing premigration, control proceeds to block 508 where the storage manager 105 increases the number of physical devices to be used for premigration.

If at block 504, the storage manager 105 determines that the average size of queued logical volumes is less than the average size of the logical volumes currently undergoing premigration, control proceeds to block 512 where the storage manager 105 decreases the number of physical devices to be used for premigration.

If at block 504, the storage manager 105 determines that the average size of queued logical volumes is the same as the average size of the logical volumes currently undergoing premigration, control returns to block 500 without making any change to the number of existing physical devices for premigration. From blocks 508 and 512 control returns to block 500 after the storage manager 105 has adjusted the numbers of physical devices for premigration.

The logic of FIG. 5, recognizes that the overall performance impact for premigrating a smaller logical volume is more than the performance impact for premigrating a larger logical volume. Therefore, for smaller logical volumes more physical devices are required for the same premigration workload, and a larger value of N is required relative to the situation where the storage manager 105 is premigrating larger logical volumes.

The implementations optimize the utilization of physical devices 110a . . . 110n in the VTS 100 by adjusting the number of physical devices to be used for premigration of logical volumes from the cache 114 to the physical devices 110a . . . 110n. The overall system performance for the VTS 100 increases when compared to the situation where the number of physical devices used for prefiguration is fixed a priori. Notwithstanding the prior use of the VTS 100 to premigrate volumes from the cache 106 to the physical devices 110a . . . 110n, the described implementations provide improved techniques for still further performance improvement while premigrating volumes from the cache 106 to the physical devices 110a . . . 110n. The described implementations determine the operating state of the VTS 100, and based on the operating state of the VTS 100 optimizes the number of physical devices 110a . . . 110n used for premigration.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

Figure 6:
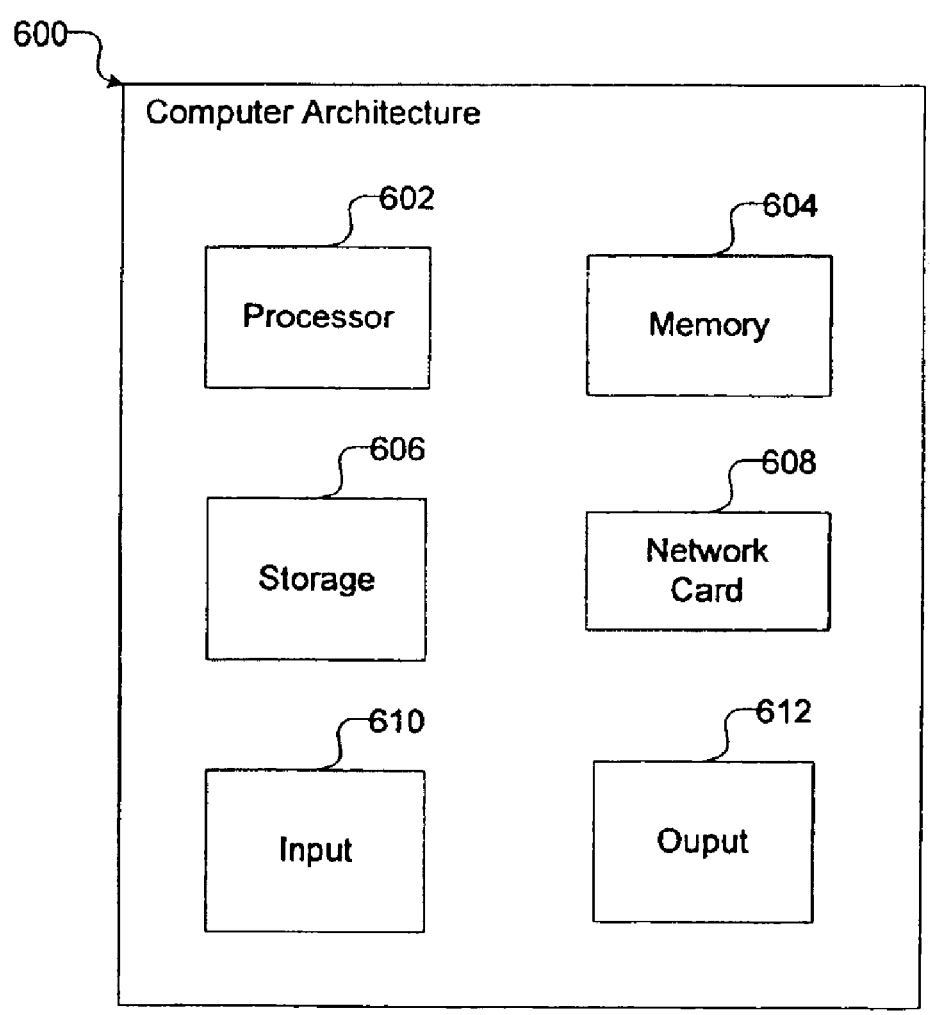
FIG. 6 illustrates a block diagram of a computer architecture in which certain described aspects of the invention are implemented.

FIG. 6 illustrates a block diagram of a computer architecture in which certain aspects of the invention are implemented. FIG. 6 illustrates one implementation of the VTS 100 and the hosts 102a . . . 102n. These VTS 100 and the hosts 102a . . . 102n may implement a computer architecture 600 having a processor 602 (e.g., a microprocessor, such as the CPU 104), a memory 604 (e.g., a volatile memory device), and storage 606 (e.g., a non-volatile storage, magnetic disk drives, optical disk drives, tape drives, etc.). The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc.

The logic of FIGS. 3 to 5 describe specific operations occurring in a particular order. Further, the operations may be performed in parallel as well as sequentially. In alternative implementations, certain of the logic operations may be performed in a different order, modified or removed and still implement implementations of the present invention. Morever, steps may be added to the above described logic and still conform to the implementations. Yet further steps may be performed by a single process or distributed processes.

While the hosts 102a . . . 102n and the VTS 100 communicate within a client-server paradigm in the described implementations, the hosts 102a . . . 102n and the VTS 100 may also communicate within a peer-to-peer or any other paradigm known in the art. Furthermore, many of the software and hardware components have been described in separate modules for purposes of illustration. Such components may be integrated into a fewer number of components or divided into a larger number of components. Additionally, certain operations described as performed by a specific component may be performed by other components.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for optimizing storage utilization, the method comprising:

storing logical volumes in a cache, wherein the cache is coupled to a plurality of physical devices;

determining an optimum number of physical devices selected from the plurality of physical devices, wherein the determining of the optimum number of physical devices is based on a comparison of a first criterion with a second criterion; and transferring data in the logical volumes from the cache to the optimum number of physical devices.

2. The method of claim 1, wherein the plurality of physical devices are addressed by a host via a plurality of logical devices, wherein the first criterion is a number of logical devices in use and the second criterion a predetermined number of logical devices, and wherein the comparison further comprises:

comparing the number of logical devices in use with the predetermined number of logical devices.

3. The method of claim 1, wherein the first criterion is a data transfer rate at the cache, and wherein the second criterion is a predetermined maximum data transfer rate at the cache, and wherein the comparison further comprises:

comparing the data transfer rate at the cache with the predetermined maximum data transfer rate at the cache.

4. The method of claim 1, wherein the cache and the physical devices are controlled by a virtual tape server in communication with a plurality of hosts, wherein the first criterion is a data transfer rate between the hosts and the virtual tape server and the second criterion is a predetermined maximum data transfer rate, and wherein the comparison further comprises:

comparing the data transfer rate between the hosts and the virtual tape server with the predetermined maximum data transfer rate.

5. The method of claim 1, wherein the first criterion is a CPU utilization rate and the second criterion is a predetermined CPU utilization rate, and wherein the comparison further comprises:

comparing the CPU utilization rate with the predetermined CPU utilization rate.

6. The method of claim 1, wherein:

the cache comprises a DASD file buffer;

a plurality of physical volumes are mountable on the physical devices; and the cache and the physical devices are coupled to a virtual tape server that is coupled to a host.

7. The method of claim 6, wherein a request from the host for one logical volume is satisfied by the virtual tape server by:

determining if the one logical volume is available in the cache;

if the one logical volume is available in the cache, satisfying the request from the cache;

if the one logical volume is unavailable in the cache, determining if the corresponding physical volume is mounted on the physical devices;

if the corresponding physical volume is mounted on the physical devices, then transferring the one logical volume to the cache, and satisfying the request; and if the corresponding physical volume is not mounted on the physical devices then mounting the corresponding physical volume to the physical devices, transferring the one logical volume to the cache, and satisfying the request.

8. The method of claim 1, wherein the cache is coupled to the physical devices by a virtual tape server.

9. The method of claim 1, wherein transferring further comprises premigrating data from the logical volumes to the physical devices.

10. A method for optimizing storage utilization, the method comprising:

storing logical volumes in a cache, wherein the cache is coupled to a plurality of physical devices;

determining an optimum number of physical devices selected from the plurality of physical devices based on calculating an extent of data transfer between the cache and the physical devices; and transferring data in the logical volumes from the cache to the optimum number of physical devices.

11. A method for optimizing storage utilization, the method comprising:

storing logical volumes in a cache, wherein the cache is coupled to a plurality of physical devices;

determining an optimum number of physical devices selected from the plurality of physical devices based on comparing an average size of the logical volumes that are queued for premigration to the physical devices; and transferring data in the logical volumes from the cache to the optimum number of physical devices.

12. A system for optimizing storage utilization, the system comprising:

a cache;

a plurality of physical devices coupled to the cache;

means for storing logical volumes in the cache;

means for determining an optimal number of physical devices selected from the plurality of physical devices, wherein the determining of the optimal number of physical devices is based on a comparison of a first criterion with a second criterion; and means for transferring data in the logical volumes from the cache to the optimum number of physical devices.

13. The system of claim 12, wherein the plurality of physical devices are addressed by a host via a plurality of logical devices, wherein the first criterion is a number of logical devices in use and the second criterion is a predetermined number of logical devices, and wherein the comparison further comprises:

comparing the number of logical devices in use with the predetermined number of logical devices.

14. The system of claim 12, wherein the first criterion is a data transfer rate at the cache, and wherein the second criterion is a predetermined maximum data transfer rate at the cache, and wherein the comparison further comprises:

comparing the data transfer rate at the cache with the predetermined maximum data transfer rate at the cache.

15. The system of claim 12, further comprising a virtual tape server, wherein the cache and the physical devices are controlled by the virtual tape server in communication with a plurality of hosts, wherein the first criterion is a data transfer rate between the hosts and the virtual tape server and the second criterion is a predetermined maximum data transfer rate, and wherein the comparison further comprises:

comparing a data transfer rate between the hosts and the virtual tape server with a predetermined maximum data transfer rate.

16. The system of claim 12, wherein the first criterion is a CPU utilization rate and the second criterion is a predetermined CPU utilization rate, and wherein the comparison further comprises:

comparing the CPU utilization rate with the predetermined CPU utilization rate.

17. The system of claim 12, further comprising a plurality of physical volumes, a DASD file buffer and a virtual tape server, wherein:

the cache comprises the DASD file buffer;

the physical devices are coupled to the plurality of physical volumes mountable on the physical devices; and the cache and the physical devices are coupled to the virtual tape server that is coupled to a host.

18. The system of claim 17, wherein a request from the host for one logical volume is satisfied by the virtual tape server by:

determining if the one logical volume is available in the cache;

if the one logical volume is available in the cache, satisfying the request from the cache;

if the one logical volume is unavailable in the cache, determining if the corresponding physical volume is mounted on the physical devices;

if the corresponding physical volume is mounted on the physical devices, then transferring the one logical volume to the cache, and satisfying the request; and if the corresponding physical volume is not mounted on the physical devices then mounting the corresponding physical volume to the physical devices, transferring the one logical volume to the cache, and satisfying the request.

19. The system of claim 12, wherein the cache is coupled to the physical devices by a virtual tape server.

20. The system of claim 12, wherein the means for transferring further comprises premigrating data from the logical volumes to the physical devices.

21. A system for optimizing storage utilization, the system comprising:

a cache;

a plurality of physical devices coupled to the cache;

means for storing logical volumes in the cache;

means for determining an optimum number of physical devices selected from the plurality of physical devices, wherein the means for determining further performs:
  (i) a calculation of an extent of data transfer between the cache and the physical devices; and
  (ii) based on the calculation, determining the optimum number of physical devices; and means for transferring data in the logical volumes from the cache to the optimum number of physical devices.

22. A system for optimizing storage utilization, the system comprising:

a cache;

a plurality of physical devices coupled to the cache;

means for storing logical volumes in the cache;

means for determining an optimum number of physical devices selected from the plurality of physical devices, wherein the means for determining further performs:

(i) a comparison of an average size of the logical volumes that are queued for premigration to the physical devices; and (ii) based on the comparison determining the optimum number of physical devices; and means for transferring data in the logical volumes from the cache to the optimum number of physical devices.

23. An article of manufacture including code for optimizing storage utilization, wherein the article of manufacture is capable of causing operations, the operations comprising:

storing logical volumes in a cache, wherein the cache is coupled to a plurality of physical devices;

determining an optimum number of physical devices selected from the plurality of physical devices, wherein the determining of the optimum number of physical devices is based on a comparison of a first criterion with a second criterion; and;

transferring data in the logical volumes from the cache to the optimum number of physical device.

24. The article of manufacture of claim 23, wherein the plurality of physical devices are addressed by a host via a plurality of logical devices, wherein the first criterion is a number of logical devices in use and the second criterion is a predetermined number of logical devices, and wherein the comparison further comprises:

comparing the number of logical devices in use with the predetermined number of logical devices.

25. The article of manufacture of claim 23, wherein the first criterion is a data transfer rate at the cache, and wherein the second criterion is a predetermined maximum data transfer rate at the cache, and wherein the comparison further comprises:

comparing the data transfer rate at the cache with the predetermined maximum data transfer rate at the cache.

26. The article of manufacture of claim 23, wherein the cache and the physical devices are controlled by a virtual tape server in communication with a plurality of hosts, wherein the first criterion is a data transfer rate between the hosts and the virtual tape server and the second criterion is a predetermined maximum data transfer rate, and wherein the comparison further comprises:

comparing the data transfer rate between the hosts and the virtual tape server with the predetermined maximum data transfer rate.

27. The article of manufacture of claim 23, wherein the first criterion is a CPU utilization rate and the second criterion is a predetermined CPU utilization rate, and wherein the comparison further comprises:

comparing the CPU utilization rate with the predetermined CPU utilization rate.

28. The article of manufacture of claim 23, wherein:

the cache comprises a DASD file buffer;

a plurality of physical volumes are mountable on the physical devices; and the cache and the physical devices are coupled to a virtual tape server that is coupled to a host.

29. The article of manufacture of claim 28, wherein a request from the host for one logical volume is satisfied by the virtual tape server by:

determining if the one logical volume is available in the cache;

if the one logical volume is available in the cache, satisfying the request from the cache;

if the one logical volume is unavailable in the cache, determining if the corresponding physical volume is mounted on the physical devices;

if the corresponding physical volume is mounted on the physical devices, then transferring the one logical volume to the cache, and satisfying the request; and if the corresponding physical volume is not mounted on the physical devices then mounting the corresponding physical volume to the physical devices, transferring the one logical volume to the cache, and satisfying the request.

30. The article of manufacture of claim 23, wherein the cache is coupled to the physical devices by a virtual tape server.

31. The article of manufacture of claim 23, wherein transferring further comprises premigrating data from the logical volumes to the physical devices.

32. An article of manufacture including code for optimizing storage utilization, wherein the article of manufacture is capable of causing operations, the operations comprising:

storing logical volumes in a cache, wherein the cache is coupled to a plurality of physical devices;

determining an optimum number of physical devices selected from the plurality of physical devices based on calculating an extent of data transfer between the cache and the physical devices; and transferring data in the logical volumes from the cache to the optimum number of physical devices.

33. An article of manufacture including code for optimizing storage utilization, wherein the article of manufacture is capable of causing operations, the operations comprising:

storing logical volumes in a cache, wherein the cache is coupled to a plurality of physical devices;

determining an optimum number of physical devices selected from the plurality of physical devices, based on comparing an average size of the logical volumes that are queued for premigration to the physical devices;

transferring data in the logical volumes from the cache to the optimum number of physical devices.

* * * * *